US 6,646,363 B2

(12) United States Patent
Kylander et al.

(10) Patent No.: US 6,646,363 B2
(45) Date of Patent: *Nov. 11, 2003

(54) ROTATING ELECTRIC MACHINE WITH COIL SUPPORTS

(75) Inventors: Gunnar Kylander, Vasteras (SE); Arne Edman, Vasteras (SE); Mats Leijon, Vasteras (SE); Nils-Ivar Landgren, Vasteras (SE)

(73) Assignee: ABB AB, Vasteras (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/355,725

(22) PCT Filed: Feb. 2, 1998

(86) PCT No.: PCT/SE98/00164
§ 371 (c)(1),
(2), (4) Date: Oct. 4, 1999

(87) PCT Pub. No.: WO98/34328
PCT Pub. Date: Aug. 6, 1998

(65) Prior Publication Data
US 2002/0125785 A1 Sep. 12, 2002

(30) Foreign Application Priority Data
Feb. 3, 1997 (SE) ............................................. 9700352
Nov. 28, 1997 (SE) ............................................. 9704423

(51) Int. Cl.[7] ............................ H02K 3/52; H02K 9/00
(52) U.S. Cl. ..................... 310/194; 310/214; 310/58; 310/269; 174/DIG. 21; 174/DIG. 27; 174/DIG. 28; 174/DIG. 29
(58) Field of Search ............................... 310/214, 215, 310/269, 194, 58; 174/22, 32, DIG. 13–33

(56) References Cited

U.S. PATENT DOCUMENTS

| 681,800 A | 9/1901 | Lasche |
| 847,008 A | 3/1907 | Kitsee |
| 1,304,451 A | 5/1919 | Burnham |
| 1,418,856 A | 6/1922 | Williamson |
| 1,481,585 A | 1/1924 | Beard |

(List continued on next page.)

FOREIGN PATENT DOCUMENTS

| AT | 399790 | 7/1995 |
| BE | 565063 | 2/1957 |
| CH | 391071 | 4/1965 |

(List continued on next page.)

OTHER PUBLICATIONS

A test installation of a self–tuned ac filter in the Konti–Skan 2 HVDC link; T. Holmgren, G. Asplund, S. Valdemarsson, P. Hidman of ABB; U. Jonsson of Svenska Krafnat; O. Ioof of Vattenfall Vastsverige AB; IEEE Stockholm Power Tech Conference Jun. 1995, pp 64–70.

(List continued on next page.)

*Primary Examiner*—Burton S. Mullins
(74) *Attorney, Agent, or Firm*—Oblon, Spivak, McClelland, Maier & Neustadt, P.C.

(57) ABSTRACT

The invention relates to a rotating electric machine comprising a stator (4) provided with windings drawn through slots in the stator, and a rotor (1) having a central axis (2) and poles (5, 6) in the form of pole pieces (8, 9) provided with windings and forming solenoids, pole gaps (13) being arranged between the poles. The machine also comprises coil supports (15, 16) in said pole gaps in order to support the solenoid windings (10, 11). It is characterized in that the coil supports (15, 16) are arranged in pairs and that each coil supports (15, 16) is shaped so that it supports only a part of the solenoid windings (10, 11) of the two adjacent poles (5, 6).

15 Claims, 3 Drawing Sheets

U.S. PATENT DOCUMENTS

| | | |
|---|---|---|
| 1,508,456 A | 9/1924 | Lenz |
| 1,728,915 A | 9/1929 | Blankenship et al. |
| 1,742,985 A | 1/1930 | Burnham |
| 1,747,507 A | 2/1930 | George |
| 1,756,672 A | 4/1930 | Barr |
| 1,762,775 A | 6/1930 | Ganz |
| 1,781,308 A | 11/1930 | Vos |
| 1,861,182 A | 5/1932 | Hendey et al. |
| 1,904,885 A | 4/1933 | Seeley |
| 1,974,406 A | 9/1934 | Apple et al. |
| 2,006,170 A | 6/1935 | Juhlin |
| 2,206,856 A | 7/1940 | Shearer |
| 2,217,430 A | 10/1940 | Baudry |
| 2,241,832 A | 5/1941 | Wahlquist |
| 2,251,291 A | 8/1941 | Reichelt |
| 2,256,897 A | 9/1941 | Davidson et al. |
| 2,295,415 A | 9/1942 | Monroe |
| 2,409,893 A | 10/1946 | Pendleton et al. |
| 2,415,652 A | 2/1947 | Norton |
| 2,424,443 A | 7/1947 | Evans |
| 2,436,306 A | 2/1948 | Johnson |
| 2,446,999 A | 8/1948 | Camilli |
| 2,459,322 A | 1/1949 | Johnston |
| 2,462,651 A | 2/1949 | Lord |
| 2,498,238 A | 2/1950 | Berberich et al. |
| 2,650,350 A | 8/1953 | Heath |
| 2,721,905 A | 10/1955 | Monroe |
| 2,749,456 A | 6/1956 | Luenberger |
| 2,780,771 A | 2/1957 | Lee |
| 2,846,599 A | 8/1958 | McAdam |
| 2,885,581 A | 5/1959 | Pileggi |
| 2,943,242 A | 6/1960 | Schaschl et al. |
| 2,947,957 A | 8/1960 | Spindler |
| 2,959,699 A | 11/1960 | Smith et al. |
| 2,962,679 A | 11/1960 | Stratton |
| 2,975,309 A | 3/1961 | Seidner |
| 3,014,139 A | 12/1961 | Shildneck |
| 3,098,893 A | 7/1963 | Pringle et al. |
| 3,130,335 A | 4/1964 | Rejda |
| 3,143,269 A | 8/1964 | Van Eldik |
| 3,157,806 A | 11/1964 | Wiedemann |
| 3,158,770 A | 11/1964 | Coggeshall et al. |
| 3,197,723 A | 7/1965 | Dortort |
| 3,268,766 A | 8/1966 | Amos |
| 3,304,599 A | 2/1967 | Nordin |
| 3,354,331 A | 11/1967 | Broeker et al. |
| 3,365,657 A | 1/1968 | Webb |
| 3,372,283 A | 3/1968 | Jaecklin |
| 3,392,779 A | 7/1968 | Tilbrook |
| 3,411,027 A | 11/1968 | Rosenberg |
| 3,418,530 A | 12/1968 | Cheever |
| 3,435,262 A | 3/1969 | Bennett et al. |
| 3,437,858 A | 4/1969 | White |
| 3,444,407 A | 5/1969 | Yates |
| 3,447,002 A | 5/1969 | Ronnevig |
| 3,484,690 A | 12/1969 | Wald |
| 3,541,221 A | 11/1970 | Aupoix et al. |
| 3,560,777 A | 2/1971 | Moeller |
| 3,571,690 A | 3/1971 | Lataisa |
| 3,593,123 A | 7/1971 | Williamson |
| 3,631,519 A | 12/1971 | Salahshourian |
| 3,644,662 A | 2/1972 | Salahshourian |
| 3,651,244 A | 3/1972 | Silver et al. |
| 3,651,402 A | 3/1972 | Leffmann |
| 3,660,721 A | 5/1972 | Baird |
| 3,666,876 A | 5/1972 | Forster |
| 3,670,192 A | 6/1972 | Andersson et al. |
| 3,675,056 A | 7/1972 | Lenz |
| 3,684,821 A | 8/1972 | Miyauchi et al. |
| 3,684,906 A | 8/1972 | Lexz |
| 3,699,238 A | 10/1972 | Hansen et al. |
| 3,716,652 A | 2/1973 | Lusk et al. |
| 3,716,719 A | 2/1973 | Angelery et al. |
| 3,727,085 A | 4/1973 | Goetz et al. |
| 3,739,212 A * | 6/1973 | Koelbel et al. ............. 310/194 |
| 3,740,600 A | 6/1973 | Turley ....................... 310/194 |
| 3,743,867 A | 7/1973 | Smith, Jr. |
| 3,746,954 A | 7/1973 | Myles et al. |
| 3,758,699 A | 9/1973 | Lusk et al. |
| 3,778,891 A | 12/1973 | Amasino et al. |
| 3,781,739 A | 12/1973 | Meyer |
| 3,787,607 A | 1/1974 | Schlafly |
| 3,792,399 A | 2/1974 | McLyman |
| 3,801,843 A | 4/1974 | Corman et al. |
| 3,809,933 A | 5/1974 | Sugawara et al. |
| 3,813,764 A | 6/1974 | Tanaka et al. |
| 3,820,048 A | 6/1974 | Ohta et al. |
| 3,828,115 A | 8/1974 | Hvizd, Jr. |
| 3,881,647 A | 5/1975 | Wolfe |
| 3,884,154 A | 5/1975 | Marten |
| 3,891,880 A | 6/1975 | Britsch |
| 3,902,000 A | 8/1975 | Forsyth et al. |
| 3,912,957 A | 10/1975 | Reynolds |
| 3,932,779 A | 1/1976 | Madsen |
| 3,932,791 A | 1/1976 | Oswald |
| 3,943,392 A | 3/1976 | Keuper et al. |
| 3,947,278 A | 3/1976 | Youtsey |
| 3,965,408 A | 6/1976 | Higuchi et al. |
| 3,968,388 A | 7/1976 | Lambrecht et al. |
| 3,971,543 A | 7/1976 | Shanahan |
| 3,974,314 A | 8/1976 | Fuchs |
| 3,993,860 A | 11/1976 | Snow et al. |
| 3,995,785 A | 12/1976 | Arick et al. |
| 4,001,616 A | 1/1977 | Lonseth et al. |
| 4,008,367 A | 2/1977 | Sunderhauf |
| 4,008,409 A | 2/1977 | Rhudy et al. |
| 4,031,310 A | 6/1977 | Jachimowicz |
| 4,039,740 A | 8/1977 | Iwata |
| 4,041,431 A | 8/1977 | Enoksen |
| 4,047,138 A | 9/1977 | Steigerwald |
| 4,064,419 A | 12/1977 | Peterson |
| 4,084,307 A | 4/1978 | Schultz et al. |
| 4,085,347 A | 4/1978 | Lichius |
| 4,088,953 A | 5/1978 | Sarian |
| 4,091,138 A | 5/1978 | Takagi et al. |
| 4,091,139 A | 5/1978 | Quirk |
| 4,099,227 A | 7/1978 | Liptak |
| 4,103,075 A | 7/1978 | Adam |
| 4,106,069 A | 8/1978 | Trautner et al. |
| 4,107,092 A | 8/1978 | Carnahan et al. |
| 4,109,098 A | 8/1978 | Olsson et al. |
| 4,121,148 A | 10/1978 | Platzer |
| 4,132,914 A | 1/1979 | Khutoretsky et al. |
| 4,134,036 A | 1/1979 | Curtiss |
| 4,134,055 A | 1/1979 | Akamatsu |
| 4,134,146 A | 1/1979 | Stetson |
| 4,149,101 A | 4/1979 | Lesokhin et al. |
| 4,152,615 A | 5/1979 | Calfo et al. |
| 4,160,193 A | 7/1979 | Richmond |
| 4,164,672 A | 8/1979 | Flick |
| 4,164,772 A | 8/1979 | Hingorani |
| 4,177,397 A | 12/1979 | Lill |
| 4,177,418 A | 12/1979 | Brueckner et al. |
| 4,184,186 A | 1/1980 | Barkan |
| 4,200,817 A | 4/1980 | Bratoljic |
| 4,200,818 A | 4/1980 | Ruffing et al. |
| 4,206,434 A | 6/1980 | Hase |
| 4,207,427 A | 6/1980 | Beretta et al. |
| 4,207,482 A | 6/1980 | Neumeyer et al. |
| 4,208,597 A | 6/1980 | Mulach et al. |
| 4,229,721 A | 10/1980 | Koloczek et al. |

| | | | | | |
|---|---|---|---|---|---|
| 4,238,339 A | 12/1980 | Khutoretsky et al. | 4,588,916 A | 5/1986 | Lis |
| 4,239,999 A | 12/1980 | Vinokurov et al. | 4,590,416 A | 5/1986 | Porche et al. |
| 4,245,182 A | 1/1981 | Aotsu et al. | 4,594,630 A | 6/1986 | Rabinowitz et al. |
| 4,246,694 A | 1/1981 | Raschbichler et al. | 4,607,183 A | 8/1986 | Rieber et al. |
| 4,255,684 A | 3/1981 | Mischler et al. | 4,615,109 A | 10/1986 | Wcislo et al. |
| 4,258,280 A | 3/1981 | Starcevic | 4,615,778 A | 10/1986 | Elton |
| 4,262,209 A | 4/1981 | Berner | 4,618,795 A | 10/1986 | Cooper et al. |
| 4,274,027 A | 6/1981 | Higuchi et al. | 4,619,040 A | 10/1986 | Wang et al. |
| 4,281,264 A | 7/1981 | Keim et al. | 4,622,116 A | 11/1986 | Elton et al. |
| 4,292,558 A | 9/1981 | Flick et al. | 4,633,109 A | 12/1986 | Feigel |
| 4,307,311 A | 12/1981 | Grozinger | 4,650,924 A | 3/1987 | Kauffman et al. |
| 4,308,476 A | 12/1981 | Schuler | 4,652,963 A | 3/1987 | Fahlen |
| 4,308,575 A | 12/1981 | Mase | 4,656,316 A | 4/1987 | Meltsch |
| 4,310,966 A | 1/1982 | Breitenbach | 4,656,379 A | 4/1987 | McCarty |
| 4,314,168 A | 2/1982 | Breitenbach | 4,663,603 A | 5/1987 | van Riemsdijk et al. |
| 4,317,001 A | 2/1982 | Silver et al. | 4,677,328 A | 6/1987 | Kumakura |
| 4,320,645 A | 3/1982 | Stanley | 4,687,882 A | 8/1987 | Stone et al. |
| 4,321,426 A | 3/1982 | Schaeffer et al. | 4,692,731 A | 9/1987 | Osinga |
| 4,321,518 A | 3/1982 | Akamatsu | 4,723,083 A | 2/1988 | Elton |
| 4,326,181 A | 4/1982 | Allen | 4,723,104 A | 2/1988 | Rohatyn |
| 4,330,726 A | 5/1982 | Albright et al. | 4,724,345 A | 2/1988 | Elton et al. |
| 4,337,922 A | 7/1982 | Streiff et al. | 4,732,412 A | 3/1988 | van der Linden et al. |
| 4,341,989 A | 7/1982 | Sandberg et al. | 4,737,704 A | 4/1988 | Kalinnikov et al. |
| 4,347,449 A | 8/1982 | Beau | 4,745,314 A | 5/1988 | Nakano |
| 4,347,454 A | 8/1982 | Gellert et al. | 4,761,602 A | 8/1988 | Leibovich |
| 4,357,542 A | 11/1982 | Kirschbaum | 4,766,365 A | 8/1988 | Bolduc et al. |
| 4,360,748 A | 11/1982 | Raschbichler et al. | 4,771,168 A | 9/1988 | Gundersen et al. |
| 4,361,723 A | 11/1982 | Hvizd, Jr. et al. | 4,785,138 A | 11/1988 | Breitenbach et al. |
| 4,363,612 A | 12/1982 | Walchhutter | 4,795,933 A | 1/1989 | Sakai ........................ 310/269 |
| 4,365,178 A | 12/1982 | Lenz | 4,827,172 A | 5/1989 | Kobayashi |
| 4,367,425 A | 1/1983 | Mendelsohn et al. | 4,845,308 A | 7/1989 | Womack, Jr. et al. |
| 4,367,890 A | 1/1983 | Spirk | 4,847,747 A | 7/1989 | Abbondanti |
| 4,368,418 A | 1/1983 | DeMello et al. | 4,853,565 A | 8/1989 | Elton et al. |
| 4,369,389 A | 1/1983 | Lambrecht | 4,859,810 A | 8/1989 | Cloetens et al. |
| 4,371,745 A | 2/1983 | Sakashita | 4,859,989 A | 8/1989 | McPherson |
| 4,384,944 A | 5/1983 | Silver et al. | 4,860,430 A | 8/1989 | Raschbichler et al. |
| 4,387,316 A | 6/1983 | Katsekas | 4,864,266 A | 9/1989 | Feather et al. |
| 4,401,920 A | 8/1983 | Taylor et al. | 4,883,230 A | 11/1989 | Lindstrom |
| 4,403,163 A | 9/1983 | Armerding et al. | 4,890,040 A | 12/1989 | Gundersen |
| 4,404,486 A | 9/1983 | Keim et al. | 4,894,284 A | 1/1990 | Yamanouchi et al. |
| 4,411,710 A | 10/1983 | Mochizuki et al. | 4,914,386 A | 4/1990 | Zocholl |
| 4,421,284 A | 12/1983 | Pan | 4,918,347 A | 4/1990 | Takaba |
| 4,425,521 A | 1/1984 | Rosenberry, Jr. et al. | 4,918,835 A | 4/1990 | Raschbichler et al. |
| 4,426,771 A | 1/1984 | Wang et al. | 4,924,342 A | 5/1990 | Lee |
| 4,429,244 A | 1/1984 | Nikiten et al. | 4,926,079 A | 5/1990 | Niemela et al. |
| 4,431,960 A | 2/1984 | Zucker | 4,942,326 A | 7/1990 | Butler, III et al. |
| 4,432,029 A | 2/1984 | Lundqvist | 4,949,001 A | 8/1990 | Campbell |
| 4,437,464 A | 3/1984 | Crow | 4,982,147 A | 1/1991 | Lauw |
| 4,443,725 A | 4/1984 | Derderian et al. | 4,990,810 A * | 2/1991 | Newhouse .................. 310/179 |
| 4,470,884 A | 9/1984 | Carr | 4,994,952 A | 2/1991 | Silva et al. |
| 4,473,765 A | 9/1984 | Butman, Jr. et al. | 4,997,995 A | 3/1991 | Simmons et al. |
| 4,475,075 A | 10/1984 | Munn | 5,012,125 A | 4/1991 | Conway |
| 4,477,690 A | 10/1984 | Nikitin et al. | 5,030,813 A | 7/1991 | Stanisz |
| 4,481,438 A | 11/1984 | Keim | 5,036,165 A | 7/1991 | Elton et al. ............ 174/102 SC |
| 4,484,106 A | 11/1984 | Taylor et al. | 5,036,238 A | 7/1991 | Tajima ........................ 310/214 |
| 4,488,079 A | 12/1984 | Dailey et al. | 5,066,881 A | 11/1991 | Elton et al. |
| 4,490,651 A | 12/1984 | Taylor et al. | 5,067,046 A | 11/1991 | Elton et al. |
| 4,503,284 A | 3/1985 | Minnick et al. | 5,083,360 A | 1/1992 | Valencic et al. |
| 4,508,251 A | 4/1985 | Harada et al. | 5,086,246 A | 2/1992 | Dymond et al. |
| 4,510,077 A | 4/1985 | Elton | 5,091,609 A | 2/1992 | Sawada et al. |
| 4,517,471 A | 5/1985 | Sachs | 5,094,703 A | 3/1992 | Takaoka et al. |
| 4,520,287 A | 5/1985 | Wang et al. | 5,095,175 A | 3/1992 | Yoshida et al. |
| 4,523,249 A | 6/1985 | Arimoto | 5,097,241 A | 3/1992 | Smith et al. |
| 4,538,131 A | 8/1985 | Baier et al. | 5,097,591 A | 3/1992 | Wcislo et al. |
| 4,546,210 A | 10/1985 | Akiba et al. | 5,111,095 A | 5/1992 | Hendershot |
| 4,551,780 A | 11/1985 | Canay | 5,124,607 A | 6/1992 | Rieber et al. |
| 4,552,990 A | 11/1985 | Persson et al. | 5,136,459 A | 8/1992 | Fararooy |
| 4,557,038 A | 12/1985 | Wcislo et al. | 5,140,204 A * | 8/1992 | Cashmore et al. .......... 310/214 |
| 4,560,896 A | 12/1985 | Vogt et al. | 5,140,290 A | 8/1992 | Dersch |
| 4,565,929 A | 1/1986 | Baskin et al. | 5,153,460 A | 10/1992 | Bovino et al. |
| 4,571,453 A | 2/1986 | Takaoka et al. | 5,168,662 A | 12/1992 | Nakamura et al. |

| | | |
|---|---|---|
| 5,171,941 A | 12/1992 | Shimizu et al. |
| 5,175,396 A | 12/1992 | Emery et al. |
| 5,182,537 A | 1/1993 | Thuis |
| 5,187,428 A | 2/1993 | Hutchison et al. |
| 5,231,249 A | 7/1993 | Kimura et al. |
| 5,235,488 A | 8/1993 | Koch |
| 5,246,783 A | 9/1993 | Spenadel et al. |
| 5,264,778 A | 11/1993 | Kimmel et al. |
| 5,287,262 A | 2/1994 | Klein |
| 5,293,146 A | 3/1994 | Aosaki et al. |
| 5,304,883 A | 4/1994 | Denk |
| 5,305,961 A | 4/1994 | Errard et al. |
| 5,321,308 A | 6/1994 | Johncock |
| 5,323,330 A | 6/1994 | Asplund et al. |
| 5,325,008 A | 6/1994 | Grant |
| 5,325,259 A | 6/1994 | Paulsson |
| 5,327,637 A | 7/1994 | Breitenbach et al. |
| 5,341,281 A | 8/1994 | Skibinski |
| 5,343,139 A | 8/1994 | Gyugyi et al. |
| 5,355,046 A | 10/1994 | Weigelt |
| 5,365,132 A | 11/1994 | Hann et al. |
| 5,387,890 A | 2/1995 | Estop et al. |
| 5,397,513 A | 3/1995 | Steketee, Jr. |
| 5,399,941 A | 3/1995 | Grothaus et al. |
| 5,400,005 A | 3/1995 | Bobry |
| 5,408,169 A | 4/1995 | Jeanneret |
| 5,449,861 A | 9/1995 | Fujino et al. |
| 5,452,170 A | 9/1995 | Ohde et al. |
| 5,468,916 A | 11/1995 | Litenas et al. |
| 5,499,178 A | 3/1996 | Mohan |
| 5,500,632 A | 3/1996 | Halser, III |
| 5,510,942 A | 4/1996 | Bock et al. |
| 5,530,307 A | 6/1996 | Horst |
| 5,533,658 A | 7/1996 | Benedict et al. |
| 5,534,754 A | 7/1996 | Poumey |
| 5,545,853 A | 8/1996 | Hildreth |
| 5,550,410 A | 8/1996 | Titus |
| 5,583,387 A | 12/1996 | Takeuchi et al. |
| 5,587,126 A | 12/1996 | Steketee, Jr. |
| 5,598,137 A | 1/1997 | Alber et al. |
| 5,607,320 A | 3/1997 | Wright |
| 5,612,510 A | 3/1997 | Hildreth |
| 5,663,605 A | 9/1997 | Evans et al. |
| 5,672,926 A | 9/1997 | Brandes et al. |
| 5,689,223 A | 11/1997 | Demarmels et al. |
| 5,807,447 A | 9/1998 | Forrest |
| 5,834,699 A | 11/1998 | Buck et al. |

FOREIGN PATENT DOCUMENTS

| | | | |
|---|---|---|---|
| CH | 266037 | 10/1965 | |
| CH | 534448 | 2/1973 | |
| CH | 539328 | 7/1973 | |
| CH | 646403 | 2/1979 | |
| CH | 657482 | 8/1986 | |
| CH | 1189322 | 10/1986 | |
| DE | 40414 | 8/1887 | |
| DE | 277012 | 7/1914 | |
| DE | 336418 | 6/1920 | |
| DE | 372390 | 3/1923 | |
| DE | 386561 | 12/1923 | |
| DE | 387973 | 1/1924 | |
| DE | 406371 | 11/1924 | |
| DE | 425551 | 2/1926 | |
| DE | 426793 | 3/1926 | |
| DE | 432169 | 7/1926 | |
| DE | 433749 | 9/1926 | |
| DE | 435608 | 10/1926 | |
| DE | 435609 | 10/1926 | |
| DE | 441717 | 3/1927 | |
| DE | 443011 | 4/1927 | |
| DE | 460124 | 5/1928 | |
| DE | 482506 | 9/1929 | |
| DE | 501181 | 7/1930 | |
| DE | 523047 | 4/1931 | |
| DE | 568508 | 1/1933 | |
| DE | 572030 | 3/1933 | |
| DE | 584639 | 9/1933 | |
| DE | 586121 | 10/1933 | |
| DE | 604972 | 11/1934 | |
| DE | 629301 | 4/1936 | |
| DE | 673545 | 3/1939 | |
| DE | 719009 | 3/1942 | |
| DE | 846583 | 8/1952 | |
| DE | 875227 | 4/1953 | |
| DE | 975999 | 1/1963 | |
| DE | 1465719 | 5/1969 | |
| DE | 1807391 | 5/1970 | |
| DE | 2050674 | 5/1971 | |
| DE | 1638176 | 6/1971 | |
| DE | 2155371 | 5/1973 | |
| DE | 2400698 | 7/1975 | |
| DE | 2520511 | 11/1976 | |
| DE | 25 20 511 | 11/1976 | ............ H02K/3/46 |
| DE | 2656389 | 6/1978 | |
| DE | 2721905 | 11/1978 | |
| DE | 137164 | 8/1979 | |
| DE | 138840 | 11/1979 | |
| DE | 2824951 | 12/1979 | |
| DE | 2835386 | 2/1980 | |
| DE | 2839517 | 3/1980 | |
| DE | 2854520 | 6/1980 | |
| DE | 3009102 | 9/1980 | |
| DE | 2913697 | 10/1980 | |
| DE | 2920478 | 12/1980 | |
| DE | 3028777 | 3/1981 | |
| DE | 2939004 | 4/1981 | |
| DE | 3006382 | 8/1981 | |
| DE | 3008818 | 9/1981 | |
| DE | 209313 | 4/1984 | |
| DE | 3305225 | 8/1984 | |
| DE | 3309051 | 9/1984 | |
| DE | 3441311 | 5/1986 | |
| DE | 3543106 | 6/1987 | |
| DE | 2917717 | 8/1987 | |
| DE | 3612112 | 10/1987 | |
| DE | 3726346 | 2/1989 | |
| DE | 3925337 | 2/1991 | |
| DE | 4023903 | 11/1991 | |
| DE | 4022476 | 1/1992 | |
| DE | 4233558 | 3/1994 | |
| DE | 4402184 | 8/1995 | |
| DE | 4409794 | 8/1995 | |
| DE | 4412761 | 10/1995 | |
| DE | 4420322 | 12/1995 | |
| DE | 19620906 | 1/1996 | |
| DE | 4438186 | 5/1996 | |
| DE | 19020222 | 3/1997 | |
| DE | 19547229 | 6/1997 | |
| DE | 468827 | 7/1997 | |
| DE | 134022 | 12/2001 | |
| EP | 049104 | 4/1982 | |
| EP | 0493704 | 4/1982 | |
| EP | 0056580 A1 | 7/1982 | |
| EP | 078908 | 5/1983 | |
| EP | 0120154 | 10/1984 | |
| EP | 0130124 | 1/1985 | |
| EP | 0142813 | 5/1985 | |
| EP | 0155405 | 9/1985 | |
| EP | 0102513 | 1/1986 | |
| EP | 0174783 | 3/1986 | |
| EP | 0185788 | 7/1986 | |
| EP | 0277358 | 8/1986 | |

| | | | | | |
|---|---|---|---|---|---|
| EP | 0234521 | 9/1987 | GB | 723457 | 2/1955 |
| EP | 0244069 | 11/1987 | GB | 739962 | 11/1955 |
| EP | 0246377 | 11/1987 | GB | 763761 | 12/1956 |
| EP | 0265868 | 5/1988 | GB | 805721 | 12/1958 |
| EP | 0274691 | 7/1988 | GB | 827600 | 2/1960 |
| EP | 0280759 | 9/1988 | GB | 854728 | 11/1960 |
| EP | 0282876 | 9/1988 | GB | 870583 | 6/1961 |
| EP | 0309096 | 3/1989 | GB | 913386 | 12/1962 |
| EP | 0314860 | 5/1989 | GB | 965741 | 8/1964 |
| EP | 0316911 | 5/1989 | GB | 992249 | 5/1965 |
| EP | 0317248 | 5/1989 | GB | 1024583 | 3/1966 |
| EP | 0335430 | 10/1989 | GB | 1053337 | 12/1966 |
| EP | 0342554 | 11/1989 | GB | 1059123 | 2/1967 |
| EP | 0221404 | 5/1990 | GB | 1103098 | 2/1968 |
| EP | 0375101 | 6/1990 | GB | 1103099 | 2/1968 |
| EP | 0406437 | 1/1991 | GB | 1117401 | 6/1968 |
| EP | 0439410 | 7/1991 | GB | 1135242 | 12/1968 |
| EP | 0440865 | 8/1991 | GB | 1147049 | 4/1969 |
| EP | 0469155 A1 | 2/1992 | GB | 1157885 | 7/1969 |
| EP | 0490705 | 6/1992 | GB | 1174659 | 12/1969 |
| EP | 0503817 | 9/1992 | GB | 1236082 | 6/1971 |
| EP | 0571155 | 11/1993 | GB | 1268770 | 3/1972 |
| EP | 0620570 | 10/1994 | GB | 1319257 | 6/1973 |
| EP | 0620630 | 10/1994 | GB | 1322433 | 7/1973 |
| EP | 0642027 | 3/1995 | GB | 1340983 | 12/1973 |
| EP | 0671632 | 9/1995 | GB | 1341050 | 12/1973 |
| EP | 0676777 | 10/1995 | GB | 1365191 | 8/1974 |
| EP | 0677915 | 10/1995 | GB | 1395152 | 5/1975 |
| EP | 0684679 | 11/1995 | GB | 1424982 | 2/1976 |
| EP | 0684682 | 11/1995 | GB | 1426594 | 3/1976 |
| EP | 0695019 | 1/1996 | GB | 1438610 | 6/1976 |
| EP | 0732787 | 9/1996 | GB | 1445284 | 8/1976 |
| EP | 0738034 | 10/1996 | GB | 1479904 | 7/1977 |
| EP | 0739087 A2 | 10/1996 | GB | 1493163 | 11/1977 |
| EP | 0740315 | 10/1996 | GB | 1502938 | 3/1978 |
| EP | 0749190 A2 | 12/1996 | GB | 1525745 | 9/1978 |
| EP | 0751605 | 1/1997 | GB | 2000625 | 1/1979 |
| EP | 0739087 A3 | 3/1997 | GB | 1548633 | 7/1979 |
| EP | 0749193 A3 | 3/1997 | GB | 2046142 | 11/1979 |
| EP | 0780926 | 6/1997 | GB | 2 022 327 | 12/1979 |
| EP | 0802542 | 10/1997 | GB | 2025150 | 1/1980 |
| EP | 0913912 A1 | 5/1999 | GB | 2034101 | 5/1980 |
| FR | 805544 | 4/1936 | GB | 1574796 | 9/1980 |
| FR | 841351 | 1/1938 | GB | 2070341 | 9/1981 |
| FR | 847899 | 12/1938 | GB | 2070470 | 9/1981 |
| FR | 916959 | 12/1946 | GB | 2071433 | 9/1981 |
| FR | 1011924 | 4/1949 | GB | 2081523 | 2/1982 |
| FR | 1126975 | 3/1955 | GB | 2099635 | 12/1982 |
| FR | 1238795 | 7/1959 | GB | 2105925 | 3/1983 |
| FR | 2108171 | 5/1972 | GB | 2106306 | 4/1983 |
| FR | 2251938 | 6/1975 | GB | 2106721 | 4/1983 |
| FR | 2305879 | 10/1976 | GB | 2136214 | 9/1984 |
| FR | 2376542 | 7/1978 | GB | 2140195 | 11/1984 |
| FR | 2467502 | 4/1981 | GB | 2150153 | 6/1985 |
| FR | 2481531 | 10/1981 | GB | 2268337 | 1/1994 |
| FR | 2556146 | 6/1985 | GB | 2273819 | 6/1994 |
| FR | 2594271 | 8/1987 | GB | 2283133 | 4/1995 |
| FR | 2708157 | 1/1995 | GB | 2289992 | 12/1995 |
| GB | 123906 | 3/1919 | GB | 2308490 | 6/1997 |
| GB | 268271 | 3/1927 | GB | 2332557 | 6/1999 |
| GB | 293861 | 11/1928 | HU | 175494 | 11/1981 |
| GB | 292999 | 4/1929 | JP | 60206121 | 3/1959 |
| GB | 319313 | 7/1929 | JP | 57043529 | 8/1980 |
| GB | 518993 | 3/1940 | JP | 57126117 | 5/1982 |
| GB | 537609 | 6/1941 | JP | 59076156 | 10/1982 |
| GB | 540456 | 10/1941 | JP | 59159642 | 2/1983 |
| GB | 589071 | 6/1947 | JP | 6264964 | 9/1985 |
| GB | 666883 | 2/1952 | JP | 1129737 | 5/1989 |
| GB | 685416 | 1/1953 | JP | 62320631 | 6/1989 |
| GB | 702892 | 1/1954 | JP | 2017474 | 1/1990 |
| GB | 715226 | 9/1954 | JP | 3245748 | 2/1990 |

| | | | | | | |
|---|---|---|---|---|---|---|
| JP | 4179107 | 11/1990 | | WO | WO9745922 | 12/1997 |
| JP | 318253 | 1/1991 | | WO | WO9745923 | 12/1997 |
| JP | 424909 | 1/1992 | | WO | WO9745924 | 12/1997 |
| JP | 5290947 | 4/1992 | | WO | WO9745925 | 12/1997 |
| JP | 4-168945 A * | 6/1992 | ................ 310/214 | WO | WO9745926 | 12/1997 |
| JP | 6196343 | 12/1992 | | WO | WO9745927 | 12/1997 |
| JP | 6233442 | 2/1993 | | WO | WO9745928 | 12/1997 |
| JP | 6325629 | 5/1993 | | WO | WO9745929 | 12/1997 |
| JP | 7057951 | 8/1993 | | WO | WO9745930 | 12/1997 |
| JP | 7264789 | 3/1994 | | WO | WO9745931 | 12/1997 |
| JP | 8167332 | 12/1994 | | WO | WO9745932 | 12/1997 |
| JP | 7161270 | 6/1995 | | WO | WO9745933 | 12/1997 |
| JP | 8264039 | 11/1995 | | WO | WO9745934 | 12/1997 |
| JP | 9200989 | 1/1996 | | WO | WO9745935 | 12/1997 |
| JP | 8036952 | 2/1996 | | WO | WO9745936 | 12/1997 |
| JP | 8167360 | 6/1996 | | WO | WO9745937 | 12/1997 |
| LU | 67199 | 3/1972 | | WO | WO9745938 | 12/1997 |
| SE | 90308 | 9/1937 | | WO | WO9745939 | 12/1997 |
| SE | 305899 | 11/1968 | | WO | WO9747067 | 12/1997 |
| SE | 255156 | 2/1969 | | WO | WO9820595 | 5/1998 |
| SE | 341428 | 12/1971 | | WO | WO9820596 | 5/1998 |
| SE | 453236 | 1/1982 | | WO | WO9820597 | 5/1998 |
| SE | 457792 | 6/1987 | | WO | WO 98/20598 | 5/1998 |
| SE | 502417 | 12/1993 | | WO | WO9820600 | 5/1998 |
| SU | 792302 | 1/1971 | | WO | WO 98/20602 | 5/1998 |
| SU | 425268 | 9/1974 | | WO | WO9821385 | 5/1998 |
| SU | 1019553 | 1/1980 | | WO | PCT/FR 98/00468 | 6/1998 |
| SU | 694939 | 1/1982 | | WO | WO9827634 | 6/1998 |
| SU | 955369 | 8/1983 | | WO | WO9827635 | 6/1998 |
| SU | 1511810 | 5/1987 | | WO | WO9827636 | 6/1998 |
| WO | WO8202617 | 8/1982 | | WO | WO9829927 | 7/1998 |
| WO | WO8502302 | 5/1985 | | WO | WO9829928 | 7/1998 |
| WO | WO9011389 | 10/1990 | | WO | WO9829929 | 7/1998 |
| WO | WO9012409 | 10/1990 | | WO | WO9829930 | 7/1998 |
| WO | PCT/DE 90/00279 | 11/1990 | | WO | WO9829931 | 7/1998 |
| WO | WO9101059 | 1/1991 | | WO | WO9829932 | 7/1998 |
| WO | WO9101585 | 2/1991 | | WO | WO9833731 | 8/1998 |
| WO | WO9107807 | 3/1991 | | WO | WO9833736 | 8/1998 |
| WO | PCT/SE 91/00077 | 4/1991 | | WO | WO9833737 | 8/1998 |
| WO | WO9109442 | 6/1991 | | WO | WO9834238 | 8/1998 |
| WO | WO 91/11841 | 8/1991 | | WO | WO 98/34239 | 8/1998 |
| WO | WO8115862 | 10/1991 | | WO | WO9834240 | 8/1998 |
| WO | WO 91/15755 | 10/1991 | | WO | WO9834241 | 8/1998 |
| WO | WO9201328 | 1/1992 | | WO | WO9834242 | 8/1998 |
| WO | WO9203870 | 3/1992 | | WO | WO9834243 | 8/1998 |
| WO | WO9321681 | 10/1993 | | WO | WO9834244 | 8/1998 |
| WO | WO9406194 | 3/1994 | | WO | WO9834245 | 8/1998 |
| WO | WO9518058 | 7/1995 | | WO | WO9834246 | 8/1998 |
| WO | WO9522153 | 8/1995 | | WO | WO9834247 | 8/1998 |
| WO | WO9524049 | 9/1995 | | WO | WO9834248 | 8/1998 |
| WO | WO9622606 | 7/1996 | | WO | WO9834249 | 8/1998 |
| WO | WO9622607 | 7/1996 | | WO | WO9834250 | 8/1998 |
| WO | PCT/CN 96/00010 | 10/1996 | | WO | WO9834309 | 8/1998 |
| WO | WO9630144 | 10/1996 | | WO | WO9834312 | 8/1998 |
| WO | WO9710640 | 3/1997 | | WO | WO9834315 | 8/1998 |
| WO | WO9711831 | 4/1997 | | WO | WO9834321 | 8/1998 |
| WO | WO9716881 | 5/1997 | | WO | WO9834322 | 8/1998 |
| WO | WO 97/29494 | 8/1997 | | WO | WO9834323 | 8/1998 |
| WO | WO9745288 | 12/1997 | | WO | WO9834325 | 8/1998 |
| WO | WO9745847 | 12/1997 | | WO | WO9834326 | 8/1998 |
| WO | WO9745848 | 12/1997 | | WO | WO9834327 | 8/1998 |
| WO | WO9745906 | 12/1997 | | WO | WO9834328 | 8/1998 |
| WO | WO9745907 | 12/1997 | | WO | WO9834329 | 8/1998 |
| WO | WO9745912 | 12/1997 | | WO | WO9834330 | 8/1998 |
| WO | WO9745914 | 12/1997 | | WO | WO9834331 | 8/1998 |
| WO | WO9745915 | 12/1997 | | WO | WO 98/40627 | 9/1998 |
| WO | WO9745916 | 12/1997 | | WO | WO 98/43336 | 10/1998 |
| WO | WO9745918 | 12/1997 | | WO | WO9917309 | 4/1999 |
| WO | WO9745919 | 12/1997 | | WO | WO9917311 | 4/1999 |
| WO | WO9745920 | 12/1997 | | WO | WO9917312 | 4/1999 |
| WO | WO9745921 | 12/1997 | | WO | WO9917313 | 4/1999 |

| | | |
|---|---|---|
| WO | WO9917314 | 4/1999 |
| WO | WO9917315 | 4/1999 |
| WO | WO9917316 | 4/1999 |
| WO | WO9917422 | 4/1999 |
| WO | WO9917424 | 4/1999 |
| WO | WO9917425 | 4/1999 |
| WO | WO9917426 | 4/1999 |
| WO | WO9917427 | 4/1999 |
| WO | WO9917428 | 4/1999 |
| WO | WO9917429 | 4/1999 |
| WO | WO9917432 | 4/1999 |
| WO | WO9917433 | 4/1999 |
| WO | WO9919963 | 4/1999 |
| WO | WO9919969 | 4/1999 |
| WO | WO9919970 | 4/1999 |
| WO | PCT/SE 98/02148 | 6/1999 |
| WO | WO9927546 | 6/1999 |
| WO | WO9928919 | 6/1999 |
| WO | WO9928921 | 6/1999 |
| WO | WO 99/28922 | 6/1999 |
| WO | WO9928923 | 6/1999 |
| WO | WO9928924 | 6/1999 |
| WO | WO9928925 | 6/1999 |
| WO | WO9928926 | 6/1999 |
| WO | WO9928927 | 6/1999 |
| WO | WO9928928 | 6/1999 |
| WO | WO9928929 | 6/1999 |
| WO | WO9928930 | 6/1999 |
| WO | WO9928931 | 6/1999 |
| WO | WO9928934 | 6/1999 |
| WO | WO9928994 | 6/1999 |
| WO | WO 99/29005 | 6/1999 |
| WO | WO9929008 | 6/1999 |
| WO | WO9929011 | 6/1999 |
| WO | WO9929012 | 6/1999 |
| WO | WO9929013 | 6/1999 |
| WO | WO9929014 | 6/1999 |
| WO | WO9929015 | 6/1999 |
| WO | WO9929016 | 6/1999 |
| WO | WO9929017 | 6/1999 |
| WO | WO9929018 | 6/1999 |
| WO | WO9929019 | 6/1999 |
| WO | WO9929020 | 6/1999 |
| WO | WO9929021 | 6/1999 |
| WO | WO9929022 | 6/1999 |
| WO | WO 99/29023 | 6/1999 |
| WO | WO9929024 | 6/1999 |
| WO | WO 99/29025 | 6/1999 |
| WO | WO9929026 | 6/1999 |
| WO | WO9929029 | 6/1999 |
| WO | WO9929034 | 6/1999 |

OTHER PUBLICATIONS

Analysis of faulted Power Systems; P Anderson, Iowa State University Press/Ames, Iowa, 1973, pp 255–257.

36–Kv. Generators Arise from Insulation Research; P. Sidler; *Electrical World* Oct. 15, 1932, ppp 524.

Oil Water cooled 300 MW turbine generator;L.P. Gnedin et al;*Elektrotechnika*, 1970, pp 6–8.

J&P Transformer Book 11th Edition;A. C. Franklin et al; owned by Butterworth—Heinemann Ltd, Oxford Printed by Hartnolls Ltd in Great Britain 1983, pp 29–67.

Transformerboard; H.P. Moser et al; 1979, pp 1–19.

The Skagerrak transmission—the world's longest HVDC submarine cable link; L. Haglof et al of ASEA; ASEA Journal vol. 53, No. 1–2, 1980, pp 3–12.

Direct Connection of Generators to HVDC Converters: Main Characteristics and Comparative Advantages; J.Arrillaga et al; *Electra* No. 149, 08/1993, pp 19–37.

Our flexible friend article; M. Judge; *New Scientist*, May 10, 1997, pp 44–48.

In–Service Performance of HVDC Converter transformers and oil–cooled smoothing reactors; G.L. Desilets et al; *Electra* No. 155, AUG. 1994, pp 7–29.

Transformateurs a courant continu haute tension–examen des specifications; A. Lindroth et al; *Electra* No. 141, Apr. 1992, pp 34–39.

Development of a Termination for the 77 kV–Class High Tc Superconducting Power Cable; T. Shimonosono et al; IEEE Power Delivery, vol. 12, No. 1, Jan.1997, pp 33–38.

Verification of Limiter Performance in Modern Excitation Control Systems; G. K. Girgis et al; IEEE Energy Conservation, vol. 10, No. 3, Sep.1995, pp 538–542.

A High Initial response Brushless Excitation System; T. L. Dillman et al; IEEE Power Generation Winter Meeting Proceedings, Jan. 31, 1971, pp 2089–2094.

Design, manufacturing and cold test of a superconducting coil and its cryostat for SMES applications; A. Bautista et al; IEEE Applied Superconductivity, vol. 7, No. 2, Jun.1997, pp 853–856.

Quench Protection and Stagnant Normal Zones in a Large Cryostable SMES; Y. Lvovsky et al; IEEE Applied Superconductivity, vol. 7, No. 2, 06/1997, pp 857–860.

Design and Construction of the 4 Tesla Background Coil for the Navy SMES Cable Test Apparatus; D.W. Scherbarth et al; IEEE Appliel Superconductivity, vol. 7, No. 2, 06/1997, pp 840–843.

High Speed Synchronous Motors Adjustable Speed Drives; ASEA Generation Pamphlet OG 135–101 E, Jan.1985, pp 1–4.

Billig burk motar overtonen; A. Felldin; *ERA* (TEKNIK) Aug.1994, pp 26–28.

400–kV XLPE cable system passes CIGRE test; ABB Article; ABB Review Sep.1995, pp 38.

FREQSYN—a new drive system for high power application;J–A. Bergman et al; ASEA Journal 59, Apr.1986, pp 16–19.

Canadians Create Conductive Concrete; J. Beaudoin et al; *Science*, vol. 276, May 23, 1997, pp 1201.

Fully Water–Cooled 190 MVA Generators in the Tonstad Hydroelectric Power Station; E. Ostby et al; BBC Review Aug.1969, pp 380–385.

Relocatable static var compensators help control unbundled power flows; R. C. Knight et al; *Transmission & Distribution*, Dec.1996, pp 49–54.

Investigation and Use of Asynchronized Machines in Power Systems*; N.I.Blotskii et al; *Elektrichestvo*, No. 12, 1–6, 1985, pp 90–99.

Variable–speed switched reluctance motors; P.J. Lawrenson et al; IEE proc, vol. 127, Pt.B, No. 4, Jul.1980, pp 253–265.

Das Einphasenwechselstromsystem hoherer Frequenz; J.G. Heft; Elektrische Bahnen eb; Dec.1987, pp 388–389.

Power Transmission by Direct Current;E. Uhlmann;ISBN 3–540–07122–9 Springer–Verlag, Berlin/Heidelberg/New York; 1975, pp 327–328.

Elektriska Maskiner; F. Gustavson; Institute for Elkreafteknilk, KTH; Stockholm, 1996, pp 3–6–3–12.

Die Wechselstromtechnik; A. Cour' Springer Verlag, Germany; 1936, pp 586–598.

Insulation systems for superconducting transmission cables; O.Toennesen; Nordic Insulation Symposium, Bergen, 1996, pp 425–432.

MPTC: An economical alternative to universal power flow controllers;N. Mohan; EPE 1997, Trondheim, pp 3.1027–3.1030.

Lexikon der Technik; Luger; Band 2, Grundlagen der Elektrotechnik und Kerntechnik, 1960, pp 395.

Das Handbuch der Lokomotiven (hungarian locomotive V40 1'D'); B. Hollingsworth et al; Pawlak Verlagsgesellschaft; 1933, pp. 254–255.

Synchronous machines with single or double 3–phase star–connected winding fed by 12–pulse load commutated inverter. Simulation of operational behaviour; C. Ivarson et al; ICEM 1994, International Conference on electrical machines, vol. 1, pp 267–272.

Elkrafthandboken, Elmaskiner; A. Rejminger; Elkrafthandboken, Elmaskiner 1996, 15–20.

Power Electronics—in Theory and Practice; K. Thorborg; ISBN 0–86238–341–2, 1993, pp 1–13.

Regulating transformers in power systems—new concepts and applications; E. Wirth et al; ABB Review Apr.1997, p 12–20.

Transforming transformers; S. Mehta et al; *IEEE Spectrium*, Jul 1997, pp. 43–49.

A study of equipment sizes and constraints for a unified power flow controller; J. Bian et al; IEEE Transactions on Power Delivery, vol. 12, No. 3, Jul. 1997, pp. 1385–1391.

Industrial High Voltage; F.H. Kreuger; *Industrial High Voltage* 1991 vol. I, pp. 113–117.

Hochspannungstechnik; A. Küchler; Hochspannungstechnik, VDI Verlag 1996, pp.365–366, ISBN 3–18–401530–0 or 3–540–62070–2.

High Voltage Engineering; N.S. Naidu; High Voltage Engineering, second edition 1995 ISBN 0–07–462286–2, Chapter 5, pp 91–98.

Performance Characteristics of a Wide Range Induction Type Frequency Converter; G.A. Ghoneem; Ieema Journal, Sep. 1995, pp 21–34.

International Electrotechnical Vocabulary, Chapter 551 Power Electronics;unknown author; International Electrotechnical Vocabulary Chapter 551: Power Electronics Bureau Central de la Commission Electrotechnique Internationale, Geneve; 1982, pp 1–65.

Design and manufacture of a large superconducting homopolar motor; A.D. Appleton; IEEE Transactions on Magnetics, vol. 19, No. 3, Part 2, May1983, pp 1048–1050.

Application of high temperature superconductivity to electric motor design; J.S. Edmonds et al; IEEE Transactions on Energy Conversion Jun.1992, No. 2, pp 322–329.

Power Electronics and Variable Frequency Drives; B. Bimal; IEEE industrial Electronics—Technology and Applications, 1996, pp. 356.

Properties of High Plymer Cement Mortar; M. Tamai et al; *Science & Technology in Japan, No. 63*; 1977, pp 6–14.

Weatherability of Polymer–Modified Mortars after Ten–Year Outdoor Exposure in Koriyama and Sapporo; Y. Ohama et al; *Science & Technology in Japan No. 63*; 1977, pp 26–31.

SMC Powders Open New Magnetic Applications; M. Persson (Editor); *SMC Update*, vol. 1, No. 1, Apr. 1997.

Characteristics of a laser triggered spark gap using air, Ar, CH4,H2, He, N2, SF6 and Xe; W.D. Kimura et al; Journal of Applied Physics, vol. 63, No. 6, Mar. 15, 1988, p. 1882–1888.

Low–intensy laser–triggering of rail–gaps with magnesium–aerosol switching–gases; W. Frey; 11th International Pulse Power Conference, 1997, Baltimore, USA Digest of Technical Papers, p. 322–327.

Shipboard Electrical Insulation; G. L. Moses, 1951, pp2&3.

ABB Elkrafthandbok; ABB AB; 1988; pp274–276.

Elkraft teknisk Handbok, 2 Elmaskiner; A. Alfredsson et al; 1988, pp 121–123.

High Voltage Cables in a New Class of Generators Powerformer; M. Leijon et al; Jun. 14, 1999; pp1–8.

Ohne Tranformator direkt ins Netz; Owman et al, ABB, AB; Feb. 8, 1999; pp48–51.

Submersible Motors and Wet–Rotor Motors for Centrifugal Pumps Submerged in the Fluid Handled; K.. Bienick, KSB; Feb. 25, 1988; pp9–17.

High Voltage Generators; G. Beschastnov et al; 1977; vol. 48. No. 6 pp1–7.

Eine neue Type von Unterwassermotoren; Electrotechnik und Maschinenbam, 49; Aug.1931; pp2–3.

Problems in design of the 110–5OokV high–voltage generators; Nikiti et al; World Electrotechnical Congress; 6/21–27/77; Section 1. Paper #18.

Manufacture and Testing of Roebel bars; P. Marti et al; 1960, Pub. 86, vol. 8, pp 25–31.

Hydroalternators of 110 to 220 kV Elektrotechn. Obz., vol. 64, No. 3, pp132–136 Mar. 1975; A. Abramov.

Design Concepts for an Amorphous Metal Distribution Transformer; E. Boyd et al; IEEE 11/84.

Neue Wege zum Bau zweipoliger Turbogeneratoren bis 2 GVA, 6OkV Elektrotechnik und Maschinenbau Wien Janner 1972, Heft 1, Seite 1–11; G. Aichholzer.

Optimizing designs of water–resistant magnet wire; V. Kuzenev et al; Elektrotekhnika, vol. 59, No. 12, pp35–40, 1988.

Zur Entwicklung der Tauchpumpenmotoren; A. Schanz; KSB, pp19–24.

Direct Generation of alternating current at high voltages; R. Parsons; IEEE Journal, vol. 67 #393, Jan. 15, 1929; pp1065–1080.

Stopfbachslose Umwalzpumpen–ein wichtiges Element im modernen Kraftwerkbau; H. Holz, KSB 1, pp13–19, 1960.

Zur Geschichte der Brown Boveri–Synchron–Maschinen; Vierzig Jahre Generatorbau; Jan.–Feb. 1931 pp15–39.

Technik und Anwendung moderner Tauchpumpen; A. Heumann; 1987.

High capacity synchronous generator having no tooth statorl V.S. Kildishev et al; No. 1, 1977 pp11–16.

Der Asynchronmotor als Antrieb stopfbcichsloser Pumpen; E. Picmaus; Eletrotechnik und Maschinenbay No. 78, pp153–155, 1961.

Low core loss rotating flux transformer; R. F. Kruase, et al; American Institute Physics J.Appl.Phys vol. 64 #10 Nov.1988, pp5376–5378.

An EHV bulk Power transmission line Made with Low Loss XLPE Cable;Ichihara et al; 8/92; pp3–6.

Underground Transmission Systems Reference Book; 1992;pp16–19; pp36–45; pp67–81.

Power System Stability and Control; P. Kundur, 1994; pp23–25;p. 767.

Six phase Synchronous Machine with AC and DC Stator Connections, Part II: Harmonic Studies and a proposed Uninterruptible Power Supply Scheme; R. Schiferl et al; Aug.–1983 pp 2694–2701.

Six phase Synchronous Machine with AC and DC Stator Connections Part 1: Equivalent circuit representation and Steady–State Analysis; R. Schiferl et al; Aug. –1983; pp2685–2693.

Reactive Power Compensation; T. Petersson; 1993; pp 1–23.

Permanent Magnet Machines; K. Binns; 1987; pp 9–1 through 9–26.

Hochspannungsaniagen for Wechselstrom; 97. Hochspannungsaufgaben an Generatoren und Motoren; Roth et al; 1938; pp452–455.

Hochspannungsanlagen for Wechselstrom; 97. Hochspannungsaufgaben an Generatoren und Motoren; Roth et al; Spring 1959, pp30–33.

Neue Lbsungswege zum Entwurf grosser Turbogeneratoren bis 2GVA, 6OkV; G. Aicholzer; Sep. 1974, pp249–255.

Advanced Turbine–generators—an assessment; A. Appleton, et al; International Conf. Proceedings, Lg HV Elec. Sys. Paris, FR, Aug.–Sep./1976, vol. I, Section 11–02, p1–9.

Fully slotless turbogenerators; E. Spoonder; Proc., IEEE vol. 120 #12, Dec.1973.

Toroidal winding geometry for high voltage superconducting alternators; J. Kirtley et al; MIT—Elec. Power Sys. Engrg. Lab for IEEE PES; Feb.1974.

High–Voltage Stator Winding Development; D. Albright et al; Proj. Report EL339, Project 1716, Apr. 1984.

Powerformer ™: A giant step in power plant engineering; Owman et al; CIGRE 1998, Paper 11:1.1.

Thin Type DC/DC Converter using a coreless wire transformer; K. Onda et al; Proc. IEEE Power Electronics Spec. Conf.; 6/1994, pp330–334.

Development of extruded polymer insulated superconducting cable; Jan.1992.

Transformer core losses; B. Richardson; Proc. IEEE May 1986, pp365–368.

Cloth–transformer with divided windings and tension annealed amorphous wire; T. Yammamoto et al; IEEE Translation Journal on Magnetics in Japan vol. 4, No. 9 Sep. 1989.

A study of equipment sizes and constraints for a unified power flow controller; J Bian et al; IEEE 1996.

* cited by examiner

ROTATING ELECTRIC MACHINE WITH COIL SUPPORTS

BACKGROUND OF THE INVENTION

1. Field of the Invention

The present invention relates to a rotating electric machine.

2. Discussion of the Background

Examples of rotating electric machines are synchronous machines, normal asynchronous machines as well as double-fed machines, alternating current machines, applications in asynchronous static current converter cascades, outerpole machines and synchronous flux machines.

The machine according to the invention is intended in the first place as a generator in a power station for generating electric power.

In the present application the terms "radial", "axial", "tangential" and "peripheral" constitute indications of direction defined in relation to the rotor of the machine unless expressly stated otherwise.

For vertical rotating electric machines with salient poles, known as Salient Pole Machines, coil supports are conventionally used between the different poles. The reason for this is that the rotor poles comprise pole pieces provided with a winding so that solenoids (magnet coils) are formed. Since the pole has a certain width, the long sides of the coil will not be situated in an axial plane running through the centre of the rotor, i.e. an axial plane through the long sides of the coil will be displaced parallel to an axial plane through the radial centre line of the corresponding pole. Part of the centrifugal force arising when the rotor rotates will therefore influence the long sides with a tangential force in the direction of the periphery. This force will endeavour to press the metal in the coil winding away from contact with the pole piece. The long sides of the coil thus run the risk of being bent out and, in the worst case, coming into contact with each other, which may give rise to powerful short circuits which in turn cause disturbing magnetic imbalances.

In order to prevent short circuits of the type described above, therefore, special coil supports are fitted in the pole gap, i.e. the gap or space between two adjacent poles, when deemed necessary. The task of these coil supports is thus to keep the coil windings in place. Coil supports are especially common in coils in high-speed machines.

Conventional coil supports usually consist of one or more whole-block supports, i.e. solid, substantially V-shaped supports, arranged a suitable axial distance from each other in each pole gap. Since it is desirable for the coil support to support the entire solenoid winding, each coil support will substantially block the entire area between two adjacent poles, i.e. the pole gap. The small space between two rotor poles which is not blocked by the coil support is used for ventilation so that cooling air can flow axially to cool the poles and later also the stator, depending on the type of rotating machine and the type of ventilation principle utilized. The spaces referred to are essentially the small space available near the air gap, between the rotor poles and the stator, and the equally limited space between the rotor windings and the rotor itself.

The types of ventilation which are relevant are the so called Midi-concept, axial ventilation and radial ventilation. In the Midi-concept the rotor body is used as a fan and the air passes axially through the pole gap from one side of the machine. In the case of axial ventilation axial fans are mounted on the rotor, usually two fans, one on the upper and one on the lower side. The air effects cooling of the poles and is transported axially to radial openings in the stator where it also has a cooling effect. In the absence of radial openings in the stator, however, the alternative using two axial fans is not possible. One-way axial ventilation or radial ventilation (air flowing radially through the rotor) can however manage the ventilation without radial openings in the stator core. However, radial ventilation is not possible with small rotor diameters.

It is obvious that the cooling air, or possibly some other type of gas used for cooling, able to pass the coil supports is in many cases insufficient to achieve satisfactory cooling of the machine.

The flow of cooling air permitted to pass through the pole gap is also limited by the maximum rise in temperature permissible for the air and also by the air speed having to be restricted. The latter is because, when the air is conducted through the pole gaps, it is accelerated to a speed approaching the peripheral speed of the rotor. This results in an increase in the kinetic energy of the air which is entirely lost, however, when the air leaves the machine. A retarding moment is thus caused, and consequently a power loss, which is directly reflected in the efficiency of the machine. Since these ventilation losses are directly proportional to the air flow, it is therefore desirable to have as little air resistance as possible.

According to a known device, in which an attempt is made to solve the problem of insufficient ventilation, the coil supports have been provided with apertures in order to increase the available area for the flow of cooling air. Unfortunately, these coil supports in many cases still fail to provide satisfactory ventilation. Furthermore, the coil supports force the air away from the coils which results in at least some of the air flow instead flowing closer to the stator and thus passing too far away from the coils to be of any use.

From the document U.S. Pat. No. 3,740,600 is previously known a coil support or brace which supports only part of the coil windings, namely those windings which are closest to the rotor piece. The purpose of the brace is to prevent separation of the coils from the poles by the tangential component of centrifugal force acting on the coils. The reason that the brace is designed to support only the innermost windings is that these windings, in the disclosed configuration of the poles, are particularly subjected said forces. Similar devices are also known from U.S. Pat. No. 5,036,238, GB-A-2 022 327 and DE-A-25 20 511.

Through U.S. Pat. No. 5,036,165 is known a conductor, in which the insulation is provided with an inner and an outer layer of semiconducting pyrolized glass fibre. It is also known to provide conductors in a dynamo-electric machine with such an insulation, as described in U.S. Pat. No. 5,066,881 for instance, where a semiconducting pyrolized glass fibre layer is in contact with the two parallel bars forming the conductor, and the insulation in the stator slots is surrounded by an outer layer of semiconducting pyrolized glass fibre. The pyrolized glass fibre material is described as suitable since it retains its resistivity even after the impregnation treatment.

SUMMARY OF THE INVENTION

The object of the present invention is to provide a rotating electric machine designed to eliminate the above-mentioned problems and whereby satisfactory ventilation is obtained in an efficient and simple manner.

This object is achieved by a machine of the type described herein.

Accordingly, the coil supports are arranged in pairs, and each coil support in a pair is shaped so that it supports only a part of the solenoid windings of the two adjacent poles. To continue, two coil supports in a pair are arranged axially and radially displaced in relation to each other to allow a cooling gas to flow between the coil supports. Through this arrangement the advantage is gained that the area of the flow path for the air through the pole gaps is increased and the air resistance is decreased. A larger amount of air (or other gas) can thus pass at the same flow rate, and a higher degree of cooling is obtained. Alternatively, the same amount of air may be allowed to pass at a reduced rate, whereby said power losses are reduced and the efficiency of the machine increases. This in turn offers the advantage of being able to use only one fan instead of two, as is normal with axial ventilation. Satisfactory ventilation of the coil-end package beneath the stator is also made possible with this single fan. As compared to known devices for supporting only part of the windings, the present invention has the considerable advantage that all of the windings will be supported, thus resulting in a more reliable and altogether safer machine.

Another advantage is that, if radial ventilation (air flowing radially through the rotor) is not possible, particularly in rotors with small diameters, the present invention enables one-way axial ventilation through the entire pole gap to the lower side of the stator in combination with coil supports.

The coil supports characterized in claim 1 also have the advantage that they can be used both in rotating electric machines of conventional type and in high-voltage machines using cable, i.e. high-voltage insulating electric conductors, as stator windings. Particularly pronounced advantages are achieved when the machine according to the invention is provided with stator windings composed of high-voltage cable. The high-voltage cable lies in slots in the stator which are extra deep and vertically high, and efficient ventilation is thus particularly difficult to achieve, as well as the need for it being greater.

Consequently, in the rotating electric machine according to the invention, the windings are preferably composed of cables having solid, extruded insulation, of a type now used for power distribution, such as XLPE-cables or cables with EPR-insulation. Such a cable comprises an inner conductor composed of one or more strand parts, an inner semiconducting layer surrounding the conductor, a solid insulating layer surrounding this and an outer semiconducting layer surrounding the insulating layer. Such cables are flexible, which is an important property in this context since the technology for the device according to the invention is based primarily on winding systems in which the winding is formed from cable which is bent during assembly. The flexibility of a XLPE-cable normally corresponds to a radius of curvature of approximately 20 cm for a cable with a diameter of 30 mm, and a radius of curvature of approximately 65 cm for a cable with a diameter of 80 mm. In the present application the term "flexible" is used to indicate that the winding is flexible down to a radius of curvature in the order of four times the cable diameter, preferably eight to twelve times the cable diameter.

The winding should be constructed to retain its properties even when it is bent and when it is subjected to thermal stress during operation. It is vital that the layers retain their adhesion to each other in this context. The material properties of the layers are decisive here, particularly their elasticity and relative coefficients of thermal expansion. In a XLPE-cable, for instance, the insulating layer consists of cross-linked, low-density polyethylene, and the semiconducting layers consist of polyethylene with soot and metal particles mixed in. Changes in volume as a result of temperature fluctuations are completely absorbed as changes in radius in the cable and, thanks to the comparatively slight difference between the coefficients of thermal expansion in the layers in relation to the elasticity of these materials, the radial expansion can take place without the adhesion between the layers being lost.

The material combinations stated above should be considered only as examples. Other combinations fulfilling the conditions specified and also the condition of being semiconducting, i.e. having resistivity within the range of $10^{-1}$–$10^{-6}$ ohm-cm, e.g. 1–500 ohm-cm, or 10–200 ohm-cm, naturally also fall within the scope of the invention.

The insulating layer may consist, for example, of a solid thermoplastic material such as low-density polyethylene (LDPE), high-density polyethylene (HDPE), polypropylene (PP), polybutylene (PB), polymethyl pentene ("TPX"), cross-linked materials such as cross-linked polyethylene (XLPE), or rubber such as ethylene propylene rubber (EPR) or silicon rubber.

The inner and outer semiconducting layers may be of the same basic material but with particles of conducting material such as soot or metal powder mixed in.

The mechanical properties of these materials, particularly their coefficients of thermal expansion, are affected relatively little by whether soot or metal powder is mixed in or not—at least in the proportions required to achieve the conductivity necessary according to the invention. The insulating layer and the semiconducting layers thus have substantially the same coefficients of thermal expansion.

Ethylene-vinyl-acetate copolymers/nitrile rubber (EVA/NBR), butyl graft polyethylene, ethylene-butyl-acrylate copolymers (EBA) and ethylene-ethyl-acrylate copolymers (EEA) may also constitute suitable polymers for the semiconducting layers.

Even when different types of material are used as base in the various layers, it is desirable for their coefficients of thermal expansion to be substantially the same. This is the case with the combination of the materials listed above.

The materials listed above have relatively good elasticity, with an E-modulus of E<500 MPa, preferably <200 MPa. The elasticity is sufficient for any minor differences between the coefficients of thermal expansion for the materials in the layers to be absorbed in the radial direction of the elasticity so that no cracks appear, or any other damage, and so that the layers are not released from each other. The material in the layers is elastic, and the adhesion between the layers is at least of the same magnitude as in the weakest of the materials.

The conductivity of the two semiconducting layers is sufficient to substantially equalize the potential along each layer. The conductivity of the outer semiconducting layer is sufficiently high to enclose the electrical field within the cable, but sufficiently low not to give rise to significant losses due to currents induced in the longitudinal direction of the layer.

Thus, each of the two semiconducting layers essentially constitutes one equipotential surface, and these layers will substantially enclose the electrical field between them.

There is, of course, nothing to prevent one or more additional semiconducting layers being arranged in the insulating layer.

According to a particularly advantageous feature the stator windings are composed of high-voltage cable.

An additional characteristic is that the high-voltage cable has a diameter within the interval 20–250 mm and a conductor area within the interval 80–3000 mm$^2$.

Further characteristics and advantages of the present invention are revealed in the remaining sub-claims.

According to another characteristic, each of the two coil supports in a pair covers substantially half the area occupied by the corresponding pole gap in the radial direction. The advantage is thus gained that the remainder of the pole-gap area, i.e. as much as the remaining 50%, is available for the air flow.

Alternatively, one of the two coil supports in a pair is arranged to support substantially half of the windings of the two adjacent poles and the other of the two coil supports is arranged to support substantially the other half of said windings.

According to yet another alternative, one of the two coil supports in a pair is arranged to support substantially half of the windings of the two adjacent poles and the other of the two coil supports is arranged to support the other half of said windings and an additional small number of windings in order to secure an overlap of supported windings. Through this alternative is achieved a particularly safe device due to the overlap of supported windings.

Finally, according to a particularly advantageous feature, the two coil supports in a pair are displaced axially by such a distance that the area in the axial direction between the two coil supports substantially corresponds to that part of the area of the pole gap in the radial direction which is not occupied by a coil support. Through this is ascertained that the area available for the flow of cooling gas in the axial direction, between each support in a pair, is substantially equal to the area available in the radial direction, i.e. that area in a pole gap where the air flow is not prevented by a pole support.

Rotating electric machines have conventionally been designed for voltages in the range 6–30 kV, and 30 kV has normally been considered to be an upper limit. This generally means that a generator must be connected to the power network via a transformer which steps up the voltage to the level of the power network, i.e. in the range of approximately 130–400 kV.

By using high-voltage insulated electric conductors, also termed high-voltage cables, with solid insulation similar to that used in cables for transmitting electric power (e.g. XLPE cables) the voltage of the machine can be increased to such levels that it can be connected directly to the power network without an intermediate transformer. The conventional transformer can thus be eliminated. However, an important condition for this is that satisfactory ventilation can be arranged, which is thus enabled by the present invention.

The present invention is in the first place intended for use with high voltages. High voltages shall be understood here to mean electric voltages in excess of 10 kV. A typical operating range for a device according to the invention may be voltages from 36 kV up to 800 kV. In the second place the invention is intended for use in the stated technical area at voltages below 36 kV.

BRIEF DESCRIPTION OF THE DRAWINGS

For a better understanding of the invention an embodiment will now be described by way of example, with reference to the accompanying drawings in which.

DETAILED DESCRIPTION OF THE PREFERRED EMBODIMENTS

Figure 1:
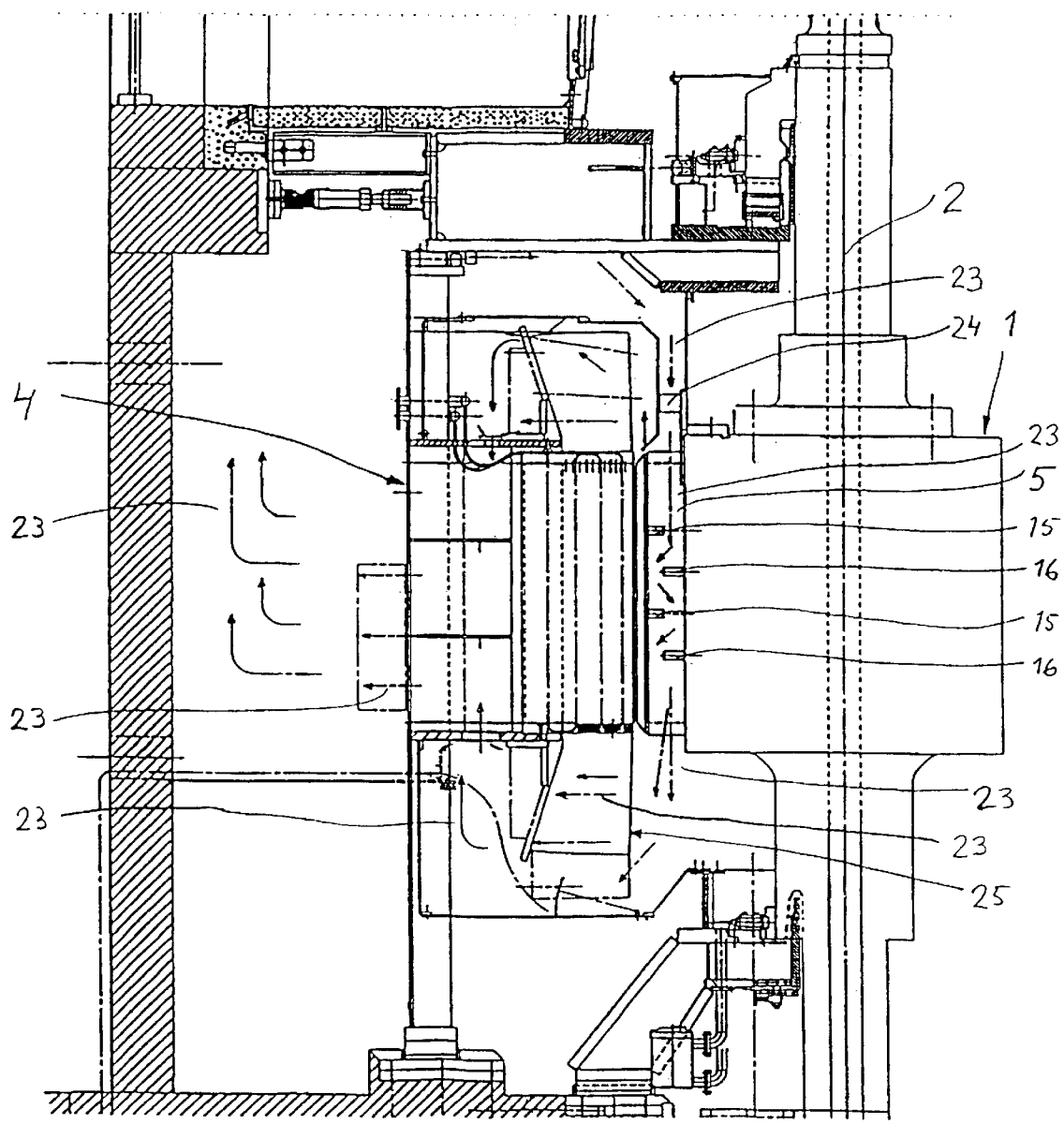
FIG. 1 shows schematically a rotating electric machine from the side, partially in section.

A rotating electric machine according to the present invention, seen from the side and partially in cross section, is shown in FIG. 1. The machine comprises a rotor 1 with a central axis 2, and a stator 4 provided with windings, preferably composed of high-voltage cable 3, drawn through slots in the stator. The rotor 1 is provided, in a known manner, with poles, 5, 6, see FIGS. 2 and 3. The poles comprise pole pieces 8, 9, each provided with windings 10, 11 to form solenoids. Between the poles, provided with the windings, is a space termed the pole gap 13. There is thus a pole gap between each pair of poles and these pole gaps extend axially along the entire poles, parallel with the central axis of the rotor.

Coil supports 15, 16 are arranged in the pole gaps in order to keep the solenoid windings 10, 11 in place. The coil supports in the embodiment shown are designed to work in pairs. Each coil support thus supports a part of the windings on the poles adjacent to the pole gap where the relevant coil support is applied.

Figure 2:
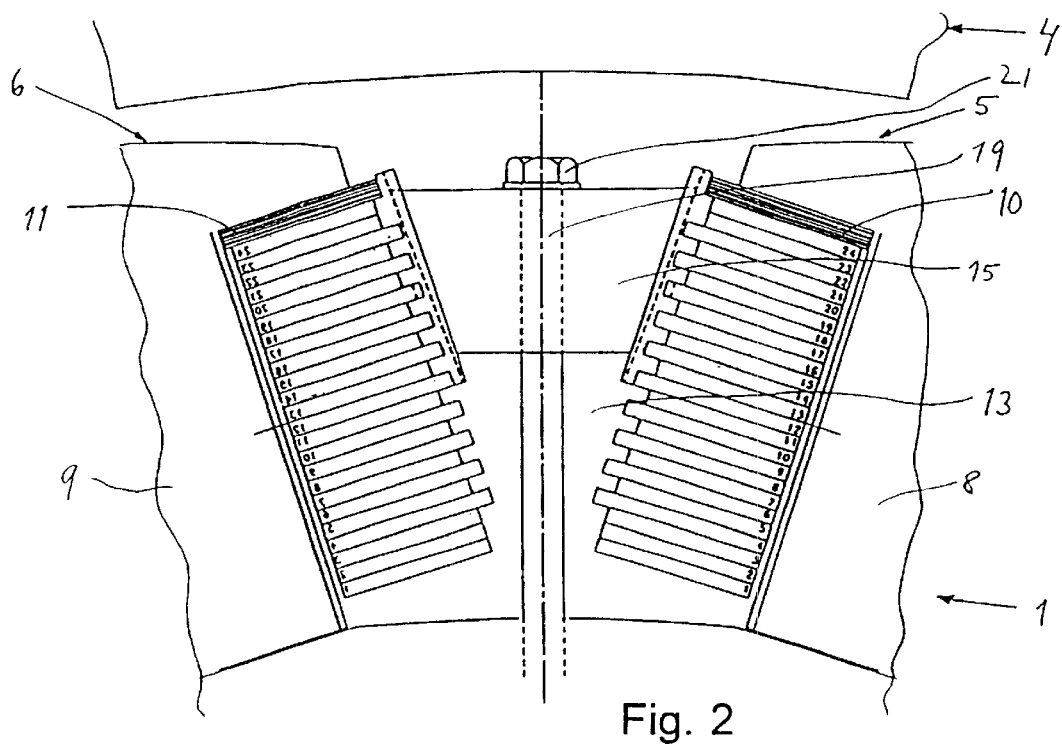
FIG. 2 shows a detailed view of a coil support, seen from above.

The coil support 15 in FIG. 2 is a body in the form of a wedge with truncated tip, its sides abutting the coil windings. The coil support fills approximately half of the area in radial direction, which the pole gap occupies of the space between the windings. The coil support in FIG. 2 is arranged to support those windings, of the respective adjacent poles, which are furthest away from the central axis of the rotor.

Figure 3:
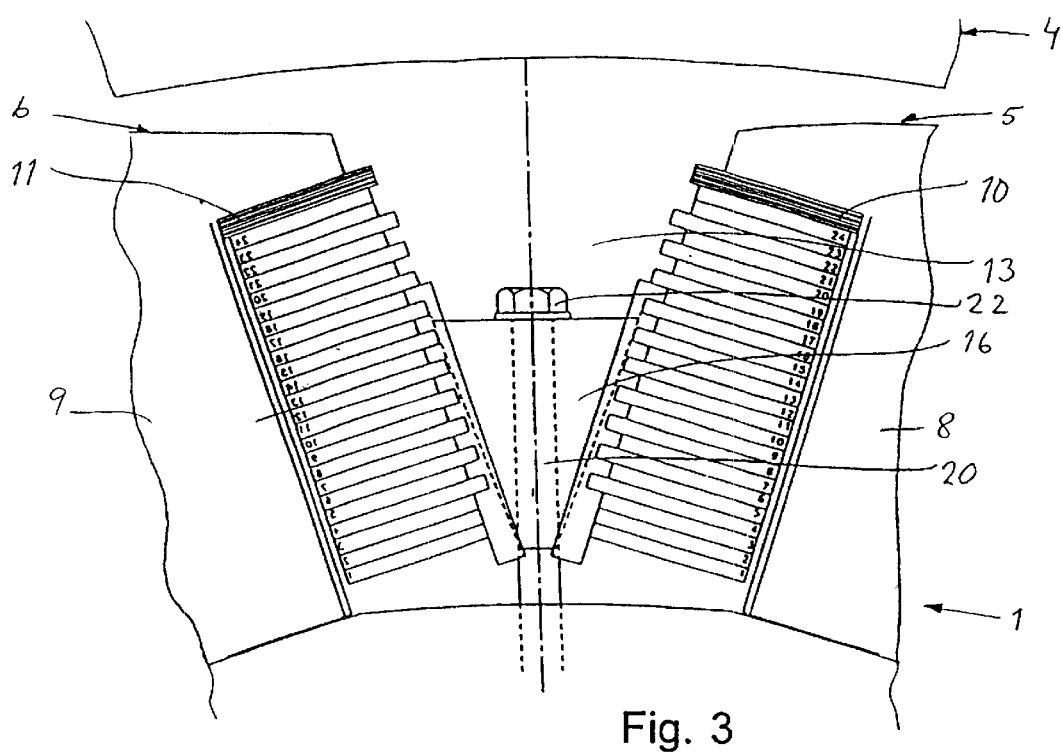
FIG. 3 shows a detailed view of another coil support, seen from above.

The coil support in FIG. 3, however, is arranged to support those windings, of the respective adjacent poles, which are nearest to the central axis of the rotor. In this case also, the coil support is in the form of a wedge-shaped body, the point being only slightly truncated, or possibly not at all. The sides of the body are in contact with and support the windings. Here, also, the body occupies approximately half the area available in the pole gap in the radial direction between the windings.

Since it is desirable for the air flow between and past the coil supports to be as uniform as possible, it is desirable for the area available to the air flow to be approximately the same size, regardless of whether the coil support is situated and designed as in FIG. 2 or as in FIG. 3. The coil supports in the two figures ought to occupy approximately equal areas. However, more exact dimensioning of each coil support is controlled in the first place by a striving towards the coil bolts 21 and 22 for the coil supports 15 and 16 taking up an equal load. The two coil supports in a pair according to the invention do not necessarily support the same number of winding turns each. Since, furthermore, for reasons of safety it is suitable for the coil supports working in pairs to be able to support the windings in the boundary area between two coil supports with a certain amount of overlap, since a certain amount of difficulty may be encountered in placing out the coil supports perfectly exactly, the coil support according to the embodiment in FIG. 3 will preferably support a few more than half of the windings, whereas the coil support in FIG. 2 supports approximately half of the windings.

Both the coil supports 15, 16 are provided with means for attachment to the rotor. In the example illustrated the coil supports are provided with a central boring 19, 20, through which an attachment screw/support bolt 21, 22 or the like can be applied. The rotor is provided with a corresponding boring so that the attachment screw can be passed through the coil support and secured in the rotor.

Reference is again made to FIG. 1 revealing how ventilation and cooling of the poles, etc. is achieved. The path of the cooling air is indicated by arrows 23. The machine includes a fan 24, which conveys cooling air axially from above into the available space, i.e. the pole gaps between the poles. The air is transported by means of this fan from the upper side of the rotor to the lower side. The air flows between the coil supports, thereby cooling the windings, and continues downwards towards the lower side of the stator where the complete lower coil-end package 25 is cooled by the same air. The air can then continue up and out through the stator 4 in order to cool this.

Figure 4:
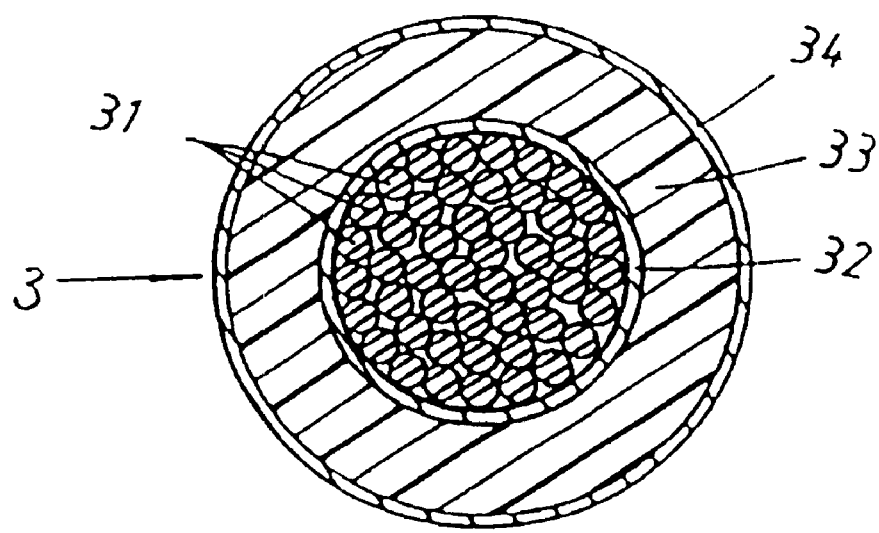
FIG. 4 shows a cross section through a high-voltage cable.

Finally, FIG. 4 shows a cross section through a high-voltage cable 3, which is particularly suitable for use with the present invention. The high-voltage cable 3 is composed of a number of strand parts 31 made of copper (Cu), for instance, and having circular cross section. These strand parts are arranged in the middle of the high-voltage cable. Surrounding the strand parts 31 is a first semiconducting layer 32. Surrounding the first semiconducting layer 32 is an insulating layer 33, e.g. XLPE-insulation, and surrounding the insulating layer 33 is a second semiconducting layer 34. The cable illustrated differs from conventional high-voltage cable in that the outer, mechanically protective sheath and the metal screen that normally surround such a cable have been eliminated. The concept "high-voltage cable" in the present application thus need not include the metal screen and the outer protective sheath that normally surround such a cable for power distribution.

In the embodiment illustrated, the two coil supports could be compared with dividing a conventional coil support into two parts, each of which is radially smaller and which are arranged at radially different distances from the central axis of the rotor. However, the invention shall not be deemed limited to this embodiment but can be varied within the scope of the inventive concept as defined in the appended claims, e.g. by different shape and/or dimensioning of the coil supports in relation to each other, or by providing the coil supports with apertures in a suitable manner, in order to further increase the area available for the flow of cooling air.

What is claimed is:

1. A rotating electric machine comprising: a stator and windings inserted in slots in the stator, and a rotor having a central axis and poles in the form of pole pieces with solenoid windings and forming solenoids, the poles being separated by pole gaps therebetween and coil supports disposed in said pole gaps in order to support the solenoid windings, wherein the coil supports are arranged in pairs and shaped so that each supports in a radial direction only a part of the solenoid windings of two adjacent poles, and the two coil supports in a pair are arranged axially and radially displaced in relation to each other to allow a cooling gas to flow between the coil supports.

2. A rotating electric machine as claimed in claim 1, wherein the winding is flexible and comprises an electrically conducting core surrounded by an inner semiconducting layer, an insulating layer surrounding the inner semiconducting layer formed of solid material, and an outer semiconducting layer surrounding the insulating layer, said layers adhering to each other.

3. A rotating electric machine as claimed in claim 2, wherein said layers comprise materials having such elasticity and with such a relation between coefficients of thermal expansion of the materials that the changes in volume in the layers caused by temperature fluctuations during operation can be absorbed by the elasticity of the materials, the layers thus retaining their adhesion to each other upon the temperature fluctuations occuring during operation.

4. A rotating electric machine as claimed in claim 3, wherein the materials in said layers have an E-modulus less than about 500 Mpa.

5. A rotating electric machine as claimed in claim 3, wherein the coefficients of thermal expansion for the materials in said layers are of substantially the same magnitude.

6. A rotating electric machine as claimed in claim 3, wherein the adhesion between the layers is of at least the same magnitude as in the lowest elastic modulus of the materials.

7. A rotating electric machine according to claim 3, wherein the materials in said layers have an E-modulus less than about 200 Mpa.

8. A rotating electric machine as claimed in claim 2 wherein each of the semiconducting layers comprise an equipotential surface.

9. A rotating electric machine as claimed in claim 2, wherein the windings of the stator comprise a high-voltage cable.

10. A rotating electric machine as claimed in claim 9, wherein the high-voltage cable has a diameter of about 20 mm to about 250 mm and a conducting area of about 80 $mm^2$ to about 3000 $mm^2$.

11. A rotating electric machine as claimed in claim 1, wherein the pole gap defines an area and each of the coil supports in a pair occupies substantially half of the area of the corresponding pole gap in a radial direction.

12. A rotating electric machine as claimed in claim 1, wherein one of the two coil supports in a pair is arranged to support substantially half of the solenoid windings of the two adjacent poles and a second one of the two coil supports is arranged to support substantially the other half of said solenoid windings.

13. A rotating electric machine as claimed in claim 1, wherein a first one of the two coil supports in a pair is arranged to support substantially half of the solenoid windings of the two adjacent poles and a second one of the two coil supports is arranged to support the other half of said solenoid windings and an additional relatively small number of solenoid windings in order to secure an overlap of supported solenoid windings.

14. A rotating electric machine as claimed in claim 1, wherein the two coil supports in a pair are displaced axially by such a distance that an area in the axial direction between the two coil supports substantially corresponds to a part of an area of the pole gap in the radial direction which is not occupied by a coil support.

15. A rotating electric machine according to claim 1, wherein the cable comprises an electrically conducting core surrounded by an insulating covering configured to confine an electric field.

* * * * *